United States Patent [19]

Wilkins et al.

[11] 3,742,984

[45] July 3, 1973

[54] GLOBE VALVE HAVING HYDRAULIC BALANCING

[75] Inventors: Ronald D. Wilkins; Morris B. May, both of Houston, Tex.

[73] Assignee: ACF Industries, Incorporated, New York, N.Y.

[22] Filed: Sept. 2, 1971

[21] Appl. No.: 177,562

[52] U.S. Cl. .................... 137/629, 251/25, 251/52
[51] Int. Cl. ........................................ F16k 31/143
[58] Field of Search .................. 251/35, 26, 52, 47, 251/25; 137/629

[56] References Cited
UNITED STATES PATENTS

| 3,428,090 | 2/1969 | Hose et al. ..................... 251/47 X |
| 945,038 | 1/1910 | Henkel ............................ 251/35 X |

FOREIGN PATENTS OR APPLICATIONS

| 706,375 | 3/1931 | France .............................. 137/629 |

*Primary Examiner*—Arnold Rosenthal
*Attorney*—Eugene N. Riddle et al.

[57] ABSTRACT

A globe valve, particularly for high pressure, high temperature steam, is equipped with an exterior bypass line for hydraulic balancing. The valve has a pneumatic operator and biases a valve plug closed by a spring. A guide for the valve plug is fitted at its lower end with a ring so that only a small amount of steam flows between the ring and the plug when the valve is closed or nearly closed; but, when the valve is open, steam flows between the plug and the ring faster than it can be evacuated by the bypass line. The steam flowing past the ring pressurizes a chamber at the top of the plug. The bypass line includes a pneumatically operated valve. When the main valve is to be opened, the bypass valve is opened, and remains open, to evacuate the chamber and begin balancing the hydraulic forces on the valve plug. The lower end of the plug is undercut, so that after partial opening of the valve, enough steam flows into the chamber to pressurize it again for assisting the next reclosing. During closing, the bypass valve remains open until the closing cycle is completed. Thus, when the plug approaches closed position, the supply of steam to the chambeis reduced and the pressure therein drops to cause hydraulic balancing again and thereby prevent the plug from slamming closed. Thereafter, the bypass valve closes and the chamber pressure increases to hold the plug tightly closed.

8 Claims, 5 Drawing Figures

United States Patent [19]
Wilkins et al.
[11] 3,742,984
[45] July 3, 1973
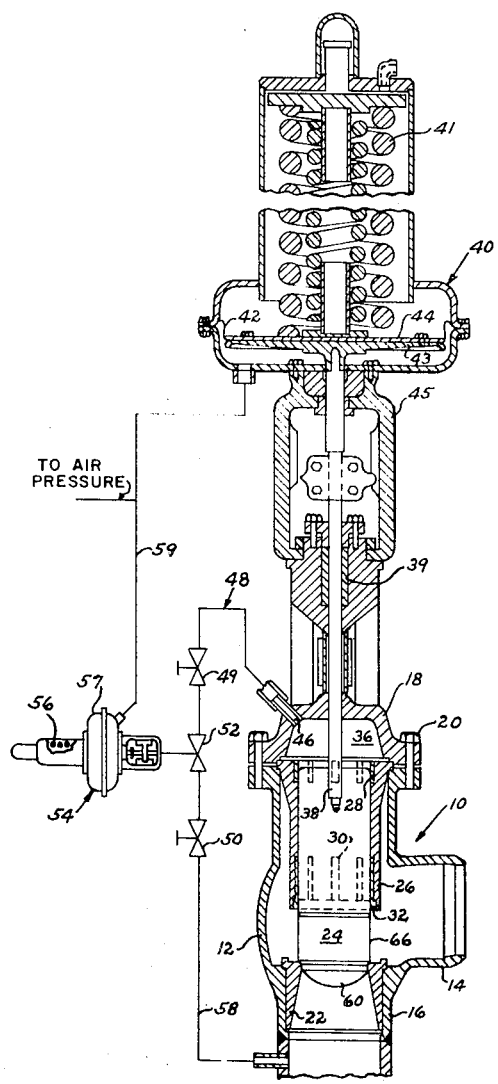

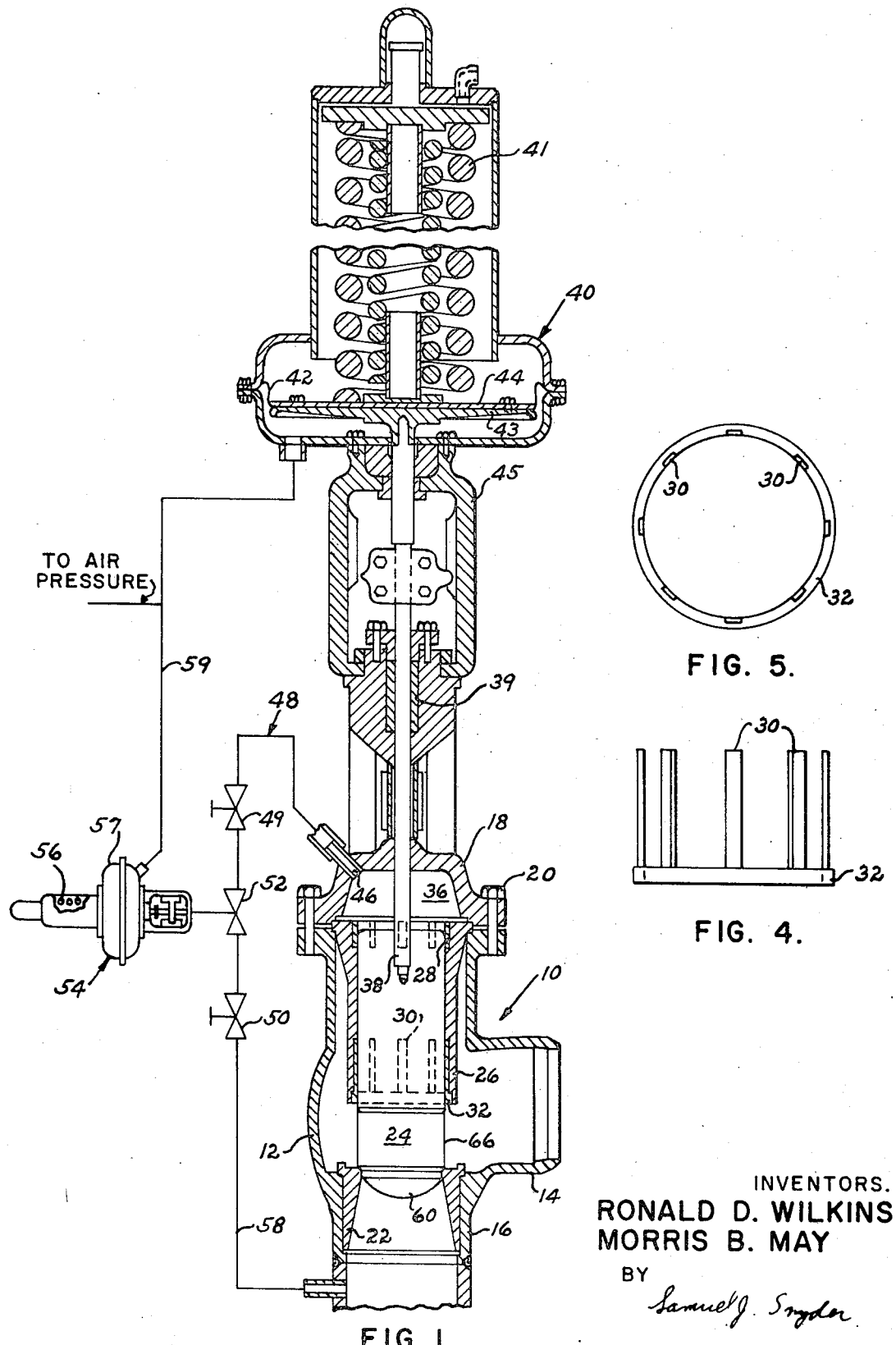

GLOBE VALVE HAVING HYDRAULIC BALANCING

BACKGROUND OF THE INVENTION

In certain applications, a valve plug is normally hydraulically balanced to some extent to permit use of smaller actuators to move and position the valve plug against the large forces created by hydraulic pressures. In low temperature service, pressure is easily piped either through the plug or around seals to permit partially balancing the hydraulic forces. With the temperatures usually associated with high pressure steam, however, elastomeric seals are not usuable. Using piston rings made from metal or carbon results in small leaks, which steam soon causes to result in badly eroded parts. The object of the present invention is to provide hydraulically balancing of a valve plug in a manner which renders the valve leak proof at temperature adequate to destroy any known elastomer.

SUMMARY OF THE INVENTION

A large globe valve for controlling high pressure, high temperature steam includes a valve body having a side inlet and a downward outlet extending from a seal ring adapted to be closed by a vertically moving plug. The valve body provides a chamber at the upper end of a valve plug. A stem extends from the upper end of the plug to a pneumatic operator having a spring which biases the valve closed. The plug moves in a guide lined with "Stellite" strips at its upper and lower ends. The lower strips are integral with a ring closely surrounding the plug. The plug has an undercut portion which passes the ring when the valve reaches a position of being about one-third open. Thus, steam flows to said chamber through a restricted passage between the ring and the plug when the valve is closed or nearly closed, but flows through a considerably larger passage between the ring and the plug when the valve is more than one-third open. The chamber above the plug is connected by a bypass line of relatively small capacity, including a pneumatically operated valve. The lower end of the bypass line feeds into a downstream portion of the valve below the seat. Normally, the valve is held closed, not only by the spring, but with a large force due to the pressure in the chamber, since the bypass valve is closed. When it is desired to open the main valve, a pressure signal is sent to the operator of the bypass valve and the operator of the main valve. Thus, the chamber is evacuated to reduce the operator force required to open the main valve. After the main valve reaches a position of about one-third open, the undercut portion of the plug passes the "Stellite" ring and the chamber is again pressurized to assist in the next reclosing of the valve. When it is desired to close the valve, the pressure is removed from the operator. Thereupon, the spring moves the plug downwardly. The bypass valve remains open, however, until the end of the closing cycle to evacuate the chamber as the plug approaches its closed position. This action prevents the plug from slamming closed.

BRIEF DESCRIPTION OF THE DRAWING

FIG. 1 is an over-all schematic view of the invention showing the main valve and actuator in section.

FIG. 4 is a plan and FIG. 5 is a top view of the guide ring and strip unit.

DESCRIPTION OF THE PREFERRED EMBODIMENT

Figure 2:
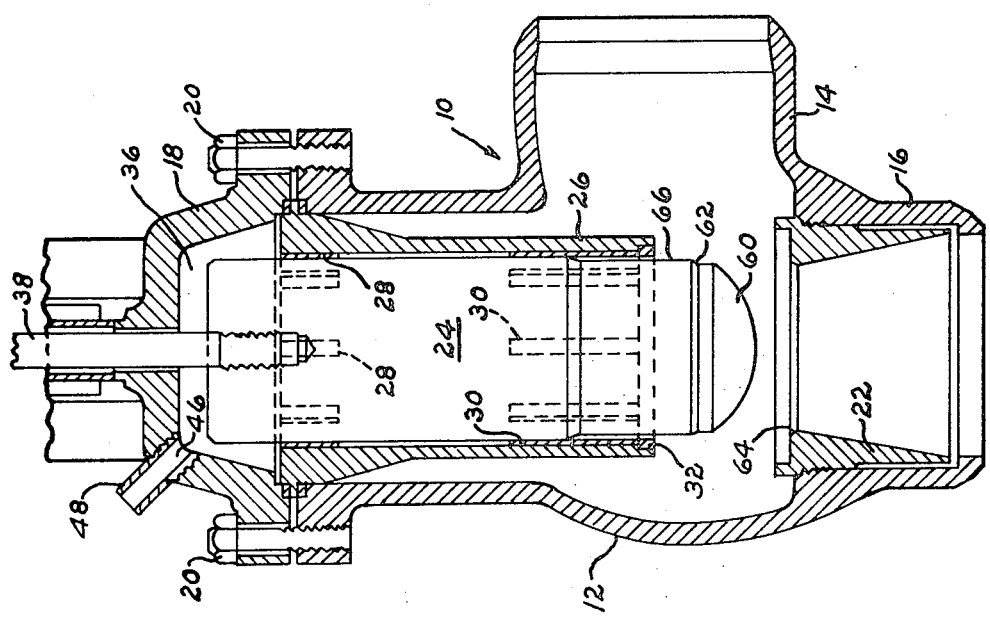
FIG. 2 is an enlarged view showing the main valve in section and closed.
Figure 3:
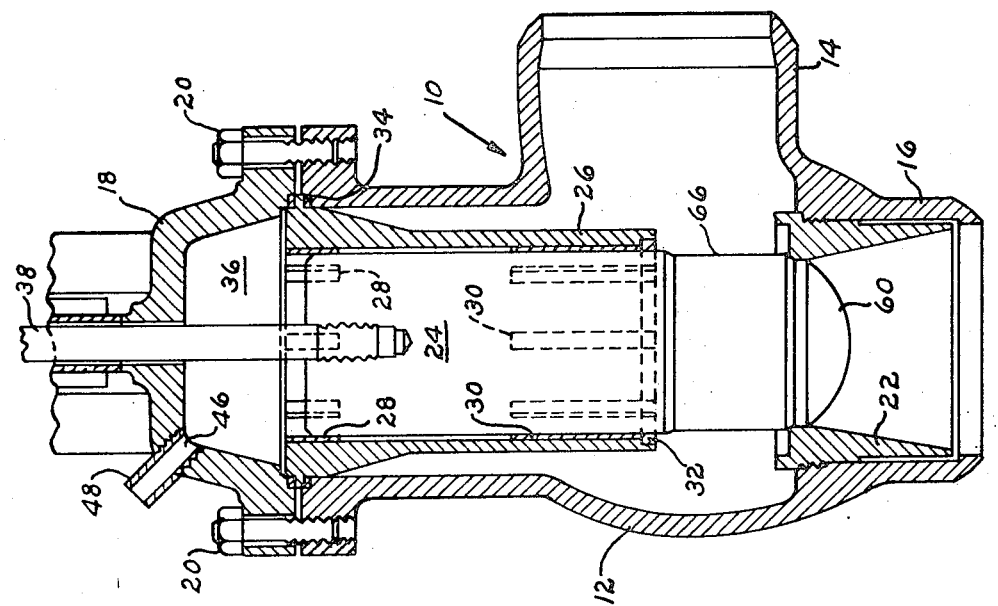
FIG. 3 is a view similar to FIG. 2 showing the valve open.

The invention relates broadly to hydraulic balancing of reciprocating valves, but, for the sake of definiteness, is described herein with reference to a globe valve for controlling high pressure, high temperature steam, where, for example, the pressure may be between 700 and 1,100 psi, and the temperature may be in the vicinity of 650 ° F. It is understood that the term "globe valve" as employed herein includes an angle valve. Referring to the drawing, a main valve 10 has a body portion 12 provided with an inlet 14 and an outlet 16. A bonnet or closure 18 is fastened to valve body 12 by bolts 20. A seat ring 22 of the venturi type is mounted in outlet 16 and is adapted to receive plug 24. The latter moves in guide 26, preferably formed of stainless steel. Guide 26 is lined with a series of vertical bearing strips 28 round its upper end and another series of like strips 30 at its lower end, which may be fused to guide 26. Strips 30 extend from and are integral with continuous ring 32, as indicated in FIGS. 4 and 5. Strips 28 and 30 and ring 32 are formed of a non-corroding, abrasion and temperature resistant material, such as "Stellite" No. 6, which is a nickel cobalt alloy manufactured by the Haynes Stellite Co. Guide 26 is held in place between valve body 12 and closure 18 with suitable gaskets 34. Valve body 18 provides a chamber 36 above valve plug 24. Stem 38 extends from valve plug 24 to pneumatic operator 40 through a suitable packing and stuffing box 39.

A suitable conduit or passageway 46 extends through bonnet 18 and communicates with chamber 36 at one end, and its other end is connected to bypass line 48. Bypass line 48 has a pair of hand valves 49 and 50 on opposite sides of valve 52. Valve 52 is a 1 inch valve provided with a pneumatic operator 54 generally similar to, but much smaller than, operator 40. The operator includes a spring 56 adapted to bias valve 52 closed, and the valve is opened by supplying air to diaphragm actuator 57. The lower end 58 of bypass line 48 is preferably connected to outlet 16 downstream of seat 22. Valves 49 and 50 are only isolating valves for closing line 48 when repair or maintenance of valve 52 is required, and at all other times valves 49 and 50 remain open.

Actuator 40 for plug 24 is preferably a pneumatic diaphragm actuator which raises plug 24 when air is supplied thereto. Actuator 40 includes spring 41 arranged to move plug 24 downward and hold valve 10 closed when actuator 40 is not pressurized. Actuator 40 also includes diaphragm 42, diaphragm plates 43, 44, and a stem connector 45. Pneumatic actuators of this type are well known in the art. Pressure is supplied by conduits 59 to actuators 40 and 54, and since actuator 40 requires a much higher pressure than relatively small actuator 54, the latter moves to valve opening position well before the pressure increases to the value needed to operate actuator 40. When the air pressure is reduced in conduit 59 to permit valve closing, actuator 40 first closes while the release of actuator 54 is delayed by the relatively large volume effect of actuator 40 until the pressure has fallen to a low value.

Plug 24 preferably has a rounded end 60 and a beveled portion 62, which in the closed position of the valve engages face 64 of seat ring 22. The portion 66 of plug 24 is slightly undercut with respect to the upper portion of the plug, so that when the plug is raised to position of about one-third open, undercut portion 66 extends above ring 32. Thus, the narrow passageway between plug 24 and ring 32 which is provided when the valve is closed, or nearly closed, is considerably enlarged after the plug has been raised to open the valve about one-third. Steam from inlet 14 passes between guide 26 and plug 24 into chamber 36.

The operation of the valve will now be described:

In the closed position, plug 24 is pressed against seat 22 by spring 41 of actuator 40 and by the pressure in chamber 36. Since valve 52 is closed, the pressure in chamber 36 approximates the pressure of the steam in inlet 14. In one embodiment of the invention in which plug 24 has a diameter of approximately 6 inches, the plug was held closed with a force of about 32,000 lbs. When it is desired to open the valve, a pressure signal is supplied to actuator 54 of bypass valve 52 and actuator 40 of the main valve. Bypass line 48 is then opened and chamber 36 is evacuated, thereby partially hydraulically balancing the forces on plug 24 and greatly reducing the force required to open valve 10. The pressure in chamber 36 drops because the flow of steam through the restricted space between close fitting ring 32 and plug 24 is much smaller than the flow through bypass line 48. As actuator 40 is pressurized, valve 10 begins to open. After valve 10 has opened about one-third, the flow of steam past ring 32 is increased, and as the valve continues to open, the pressure in chamber 36 increases. This action takes place because the flow of steam past ring 32 is then greater than the rate at which the 1 inch bypass line 48 can evacuate chamber 36. The pressure in chamber 36 when valve 10 is fully opened assists the next reclosing of the valve, so that a smaller spring, and hence a smaller actuator 40, can operate the valve.

When it is desired to close the valve, the pressure signal to actuators 40 and 54 is cut off, and fully compressed spring 41, aided by the pressure in chamber 36, pushes plug 24 down rapidly. Valve 52 remains open during the closing cycle of valve 10. After plug 24 has moved downwardly about two-thirds of its travel, the flow of steam to chamber 36 is reduced, and chamber 36 is then evacuated by open bypass line 48 again to cause partial balancing of hydraulic forces on plug 24. Reduction of the pressure in chamber 36 reduces the closing force on plug 24 and prevents it from slamming closed. Shortly after closure of valve 10, bypass valve 52 closes. This permits the pressure in chamber 36 to build up again and hold the plug tightly closed with a very high force.

What is claimed is:

1. A globe valve arrangement comprising a valve body having an inlet, an outlet, and a valve seat between the inlet and outlet; a plug having one end which is adapted to engage and close the seat, said valve body having a chamber at the other end of the plug exposed to fluid pressure from the inlet when the plug is in an open position to urge the plug toward a closed position on said seat; a bypass conduit outwardly of the plug connecting the chamber to the outlet to provide fluid communication in all positions of the plug, said conduit having a relatively small bypass valve therein; an operator for moving the bypass valve; a separate operator for moving said plug; a guide for said plug, said guide and plug having means for permitting only a limited flow rate from the inlet to said chamber when the plug is between a closed position and a predetermined partially open position and permitting a greater flow rate upon further opening of said plug, said relatively small bypass valve permitting a flow rate which is intermediate said limited flow rate and said greater flow rate, whereby pressure may be applied from said chamber to said other end of the plug even when said small bypass valve is open.

2. A globe valve arrangement according to claim 1, wherein said guide includes a ring closely surrounding the plug adjacent the inlet of the valve and said plug having an undercut portion at said one end thereof, so that said ring only permits said limited flow until said undercut portion passes the ring, whereupon said greater flow rate occurs.

3. An arrangement according to claim 2, wherein said guide includes a plurality of longitudinally extending strips forming bearing surfaces for said plug.

4. An arrangement according to claim 3, wherein a plurality of said strips are integral with said ring.

5. An arrangement according to claim 1, wherein said bypass valve is closed only after completion of the closing of the globe valve.

6. A globe valve arrangement comprising a body, a seat, and a reciprocating plug having an inner end portion which engages the seat for closing the valve; a chamber in said valve body at an outer end portion of the plug; a conduit external to said valve connected to said chamber; an auxiliary valve in said conduit adapted to be opened to evacuate said chamber and thereby reduce the pressure on the outer end portion of the plug; a pneumatic operator connected to said plug, including a spring for moving the plug to its closed position; a pneumatic operator for said auxiliary valve and pressure means for actuating said plug pneumatic operator and auxiliary valve operator; means for applying pressure from the valve inlet to the outlet end portion of the plug to hold the valve tightly closed and comprising a guide for the plug providing passages between the plug and guide, said plug being formed to partially close said passages when the plug is near its closed position; and means for reducing the pressure on the outer end portion of the plug to a low level during a predetermined initial portion only of the opening stroke of the plug for assisting the operator in opening the valve.

7. A globe valve arrangement comprising a valve body having an inlet, an outlet, and a valve seat between the inlet and outlet; a reciprocating plug having an inner end portion which engages the seat for closing the valve, said body having a chamber at an outer end portion of the plug; a pneumatic operator connected to said plug, including a spring for moving the plug to its closed position; a bypass conduit connecting the chamber and the outlet, a bypass valve in the bypass conduit, a separate pneumatic operator for moving the bypass valve; and means permitting a limited flow rate from the inlet to the chamber when the plug is between a closed position and a predetermined partially open position and permitting a greater flow rate upon further opening of the plug, the bypass valve permitting a flow rate intermediate the limited flow rate and said greater flow rate.

8. A globe valve arrangement as set forth in claim 7 wherein a guide is provided for said plug and includes a ring closely surrounding the plug adjacent the inlet of the valve, said plug having an undercut portion at the end portion thereof opposite said outer end portion so that said ring only permits said limited flow until the undercut portion passes the ring, whereupon said greater flow rate occurs.

* * * * *